US009160459B2

(12) United States Patent
Arikawa et al.

(10) Patent No.: US 9,160,459 B2
(45) Date of Patent: Oct. 13, 2015

(54) EQUALIZATION SIGNAL PROCESSOR, OPTICAL RECEIVER INCLUDING THE SAME, AND METHOD FOR EQUALIZATION SIGNAL PROCESSING

(75) Inventors: Manabu Arikawa, Tokyo (JP); Daisaku Ogasahara, Tokyo (JP); Emmanuel Le Taillandier De Gabory, Tokyo (JP); Kiyoshi Fukuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/362,784

(22) PCT Filed: Dec. 7, 2011

(86) PCT No.: PCT/JP2011/078838
§ 371 (c)(1),
(2), (4) Date: Jun. 4, 2014

(87) PCT Pub. No.: WO2013/084367
PCT Pub. Date: Jun. 13, 2013

(65) Prior Publication Data
US 2014/0328585 A1 Nov. 6, 2014

(51) Int. Cl.
*H03H 7/30* (2006.01)
*H04B 10/61* (2013.01)
*H04B 10/079* (2013.01)

(52) U.S. Cl.
CPC ........ *H04B 10/6162* (2013.01); *H04B 10/0795* (2013.01); *H04B 10/616* (2013.01)

(58) Field of Classification Search
CPC ................... H04L 25/03057; H04L 25/03885; H04L 2025/03477; H04L 2025/0349; H04L 25/03038; H04L 25/022; H04L 2025/03617; H04B 10/6971
USPC .................................................. 375/232–236
See application file for complete search history.

(56) References Cited

U.S. PATENT DOCUMENTS

| 4,633,482 A | 12/1986 | Sari |
| 6,785,327 B1 * | 8/2004 | Larsson et al. ................ 375/232 |

(Continued)

FOREIGN PATENT DOCUMENTS

| JP | S60-117827 A | 6/1985 |
| JP | H1-194613 A | 8/1989 |

(Continued)

OTHER PUBLICATIONS

Seb J. Savory, "Digital filters for coherent optical receivers," Optical Society of America, Optics Express, Jan. 21, 2008, vol. 16, No. 2, pp. 804-817. Cited in the Applicants' Specification.

(Continued)

*Primary Examiner* — Don N Vo
(74) *Attorney, Agent, or Firm* — Sughrue Mion, PLLC

(57) ABSTRACT

It becomes difficult to perform the optimum equalization signal processing in coherent receiving systems if a channel response in an optical fiber transmission line includes a factor without temporal centrosymmetry, therefore, an equalization signal processor according to an exemplary aspect of the invention includes an equalization filter means configured to receive digital signals by coherent receiving systems; a coefficient control means configured to control coefficients defining characteristics of the equalization filter means; a significant coefficient holding means configured to hold significant coefficients of significant values among initial values of the coefficients; a significant coefficient positioning means configured to determine a significant coefficient position, a position of the significant coefficients in the initial values, so that equalization characteristics of the equalization filter means may be optimized; and a significant coefficient setting means configured to allocate the significant coefficients to the significant coefficient position.

10 Claims, 8 Drawing Sheets

(56) References Cited

U.S. PATENT DOCUMENTS

2007/0082617 A1* 4/2007 McCallister .................. 455/63.1
2007/0121717 A1* 5/2007 Dong et al. .................... 375/232
2013/0064281 A1* 3/2013 Raphaeli et al. .............. 375/233

FOREIGN PATENT DOCUMENTS

| JP | H3-190328 A | 8/1991 |
|---|---|---|
| JP | H5-292139 A | 11/1993 |
| JP | H11-8575 A | 1/1999 |
| JP | 2005-520391 A | 7/2005 |

OTHER PUBLICATIONS

Ling Liu et al., "Initial Tap Setup of Constant Modulus Algorithm for Polarization De-multiplexing in Optical Coherent Receivers," Optical Society of America, Optical Fiber Communication Conference, OSA Technical Digest (CD), 2009, OMT2.pdf. Cited in the Applicants' Specification and ISR.

International Search Report for PCT Application No. PCT/JP2011/078838, mailed on Jan. 17, 2012.

* cited by examiner

EQUALIZATION SIGNAL PROCESSOR, OPTICAL RECEIVER INCLUDING THE SAME, AND METHOD FOR EQUALIZATION SIGNAL PROCESSING

This application is a National Stage Entry of PCT/JP2011/078838 filed on Dec. 7, 2011, and the entire disclosure thereof is incorporated herein.

TECHNICAL FIELD

The present invention relates to equalization signal processors, optical receivers including the same, and methods for an equalization signal processing, in particular, to an equalization signal processor, an optical receiver including the same, and a method for equalization signal processing which are used in digital coherent receiving systems.

BACKGROUND ART

It is important in long-haul optical communications to realize high spectrum utilization efficiency and, accordingly, communication systems using multi-level modulated signals or polarization-multiplexed signals have been developed. Since coherent receiving systems can receive multi-level modulated signals and polarization-multiplexed signals, they have been used in a large number of communication systems in recent years. It is possible in the coherent receiving system to obtain the information not only on the amplitude of the received light but also on the phase of it because the received light is detected by a photodetector after having interfered with local oscillator light. Concerning the signal obtained by using the coherent receiving system, therefore, it is known that by means of the digital signal processing the signal degradation while transmitting can be compensated and the obtained signal can be demodulated. The digital signal processing technology mentioned above, therefore, has become important.

By using the digital signal processing technology, it is possible to compensate a received signal with a temporal spread of the optical signal occurring due to the polarization mode dispersion, for example. The polarization mode dispersion means a difference in the propagation velocity in an optical fiber transmission line between polarization modes which is caused by a deviation from an exact circle in a fiber, and the like. Phenomena having polarization dependence in a transmission line, such as polarization mode dispersion and polarization rotation, have frequency dependence and vary temporally due to a different kind of external action such as pressure applied to a fiber. It is necessary, therefore, to perform the digital signal processing adaptively in order to equalize received signals deteriorated by a factor with such temporal variation.

It is possible to perform adaptive equalization signal processing in the time domain by using a finite impulse response (FIR) filter. In optical communication technologies, a butterfly-structured FIR filter as shown in FIG. 9 is generally employed in order to equalize signals deteriorated by a factor dependent on the polarization. The coefficients of the FIR filter are adaptively adjusted by a feedback control based on the CMA (Constant Modulus Algorithm) method or the DDLMS (Decision Directed Least Mean Square) algorithm, for example.

An example of a method for controlling a butterfly-structured FIR filter is described in Non Patent Literature 1. As shown in FIG. 9, an X-polarization input $E_X(k)$ and a Y-polarization input $E_Y(k)$ are input into a related butterfly-structured FIR filter 900, whose outputs $E_X(k)$ and $E_Y(k)$ are expressed as follows:

$$E_x(k) = h_{xx}^T \cdot E_X + h_{xy}^T \cdot E_Y = \sum_{m=0}^{M-1} [h_{xx}(m)E_X(k-m) + h_{xy}(m)E_Y(k-m)] \quad (1)$$

$$E_y(k) = h_{yx}^T \cdot E_X + h_{yy}^T \cdot E_Y = \sum_{m=0}^{M-1} [h_{yx}(m)E_X(k-m) + h_{yy}(m)E_Y(k-m)] \quad (2)$$

Here, $h_{xx} = [h_{xx}(0) \ldots h_{xx}(M-1)]$ and the like are tap coefficients of the FIR filter, and M represents the tap length. The superscript "T" denotes a transposed matrix. When the CMA method is used, these tap coefficients are controlled on the basis of the formulae (12) to (15) described in Non Patent Literature 1. The X-polarization input and Y-polarization input are weighted and summed by using the coefficients controlled by the CMA method. This enables deteriorating factors dependent on the polarization to be cancelled, and the compensation process is accomplished. As a result, proper receiving processes can be realized.

Thus, the butterfly-structured FIR filter is employed in the coherent receiving system using the digital signal processing. If the tap length of the FIR filter increases, the calculation amount necessary for updating the tap coefficients increases accordingly and this requires a large amount of circuit resources. It is desirable, therefore, to shorten the tap length of the FIR filter as much as possible. On the other hand, in order to compensate a temporal spread of a signal due to the polarization mode dispersion by using the butterfly-structured FIR filter, it is necessary to realize an inverse response of the temporal spread by means of the FIR filter. If the tap length of the FIR filter is finite, however, there is a possibility that an intended response cannot be realized.

Non Patent Literature 2 describes an example of the polarization demultiplexing in a coherent receiver which is performed by controlling the coefficients of a butterfly-structured FIR filter using the CMA method. As described in Non Patent Literature 2, in general, a response of the polarization mode dispersion, which is a main factor to be compensated by a butterfly-structured FIR filter, can be expressed by a unitary matrix, and so the inverse response can also be expressed by a unitary matrix. Accordingly, the following relation holds for the inverse response.

$$h_{yy}(t) = h_{xx}^*(-t), h_{xy}(t) = -h_{yx}^*(-t) \quad (3)$$

Here, the superscript "*" represents a complex conjugate. From the relation of formula (3), the following formulae hold:

$$|h_{xx}(t)|^2 + |h_{yy}(t)|^2 = |h_{xx}(-t)|^2 + |h_{yy}(-t)|^2 \quad (4)$$

$$|h_{xy}(t)|^2 + |h_{yx}(t)|^2 = |h_{xy}(-t)|^2 + |h_{yx}(-t)| \quad (5)$$

As can been seen from formulae (4) and (5), the magnitude of the inverse response of the polarization mode dispersion has a kind of temporal centrosymmetry. In a case where the tap coefficients of a butterfly-structured FIR filter are adaptively controlled, taking the above relationship into account, initial values of the tap coefficients are generally set so that significant coefficients may be allocated for the center tap of the FIR filter and the other coefficients may be set to "0". Here, the significant coefficients correspond to a Jones matrix representing input-output relations for respective polarization signals, which is realized by the butterfly-structured FIR filter. As described in Non Patent Literature 2, for example, the initial values of the tap coefficients of the butterfly-structured FIR filter can be set as follows:

$$h_{xx} = [0001000], h_{xy} = [0000000], h_{yx} = [0000000], h_{yy} = [0001000]$$

Here, it is assumed that the polarization rotation and temporal spread due to the transmission do not arise initially, and the tap length M is set at 7. In this example, an identical Jones matrix expressed by the following formula (6) is set at $h_{xx}(3)$, $h_{xy}(3)$, $h_{yx}(3)$, and $h_{yy}(3)$ of central tap coefficients in the FIR filter.

$$\begin{pmatrix} h_{xx}(3) & h_{xy}(3) \\ h_{yx}(3) & h_{yy}(3) \end{pmatrix} = \begin{pmatrix} 1 & 0 \\ 0 & 1 \end{pmatrix} \quad (6)$$

Then, it is possible to perform the adaptive equalization signal processing by using tap coefficients which have converged by means of the CMA method.

On the other hand, Patent Literature 1 describes an example of a compensation device to compensate a distortion having occurred in an optical fiber by using optical elements. The related compensation device described in Patent Literature 1 includes a wide-band adaptive optical equalizer, an optical feedback monitor, and a controller. The wide-band adaptive optical equalizer includes a plurality of tunable optical filter units, each of which includes a beam splitter and a differential delay element. The optical feedback monitor samples signals passing through the wide-band adaptive optical equalizer. It is said that the controller sets initial control parameters of the tunable optical filter unit and controls the wide-band adaptive optical equalizer by using the control parameters which are determined on the basis of sampling results of the optical feedback monitor. However, since the polarization mode dispersion varies temporally and it is difficult for the optical element to track the variation, it is difficult for the related compensation device to compensate the polarization mode dispersion.

Patent Literature 1: Japanese Patent Application Laid-Open Publication (Translation of PCT Application) No. 2005-520391 (paragraphs [0047] to [0087])

Non Patent Literature 1: S. J. Savory, "Digital filters for coherent optical receivers," Optics Express Vol. 16, No. 2, 2008, pp. 804-817.

Non Patent Literature 2: L. Liu et al., "Initial Tap Setup of Constant Modulus Algorithm for Polarization De-multiplexing in Optical Coherent Receivers," Optical Fiber Communication Conference, OSA Technical Digest (CD) (Optical Society of America, 2009), paper OMT2.

DISCLOSURE OF INVENTION

Problem to be Solved by the Invention

As mentioned above, the butterfly-structured FIR filter is used as an equalization signal processor in the coherent receiving system, where a Jones matrix is set at the central tap coefficients in the butterfly-structured FIR filter as initial values. It is possible to compensate the polarization mode dispersion by controlling the tap coefficients adaptively.

The factors affecting signals to be transmitted, however, are not limited to those having temporal centrosymmetry. In particular, the effect corresponding to an analog low pass filter such as band limitation is in many cases a response in which there is no temporal centrosymmetry and there is a trailing region in the fall time. In the coherent optical communications, band limitation is applied to electrical signals input into a modulator in a transmitter, for example. The band limitation on signals is also employed in an analog-to-digital converter (ADC) which performs analog to digital conversion on signals received by coherent receiving systems.

As mentioned above, a channel response including a transmitter and a receiver can include a factor without temporal centrosymmetry. In this case, if the initial values of tap coefficients are set as in the case of the related FIR filter, there may occur a case where the tap coefficients after having been converged by the adaptive control cannot realize a response of a trailing region in the fall time. That is to say, it becomes difficult to perform the optimum equalization signal processing if a Jones matrix is set at the central tap coefficients in the FIR filter as initial values and the other initial coefficients are set at zero.

As mentioned above, there is a problem that it becomes difficult for the related equalization signal processor in the coherent receiving system to perform the optimum equalization signal processing if a channel response in an optical fiber transmission line includes a factor without temporal centrosymmetry.

The objective of the present invention is to provide an equalization signal processor, an optical receiver including the same, and a method for equalization signal processing which solve the problem mentioned above that it becomes difficult to perform the optimum equalization signal processing in coherent receiving systems if a channel response in an optical fiber transmission line includes a factor without temporal centrosymmetry.

Means for Solving a Problem

An equalization signal processor according to an exemplary aspect of the invention includes an equalization filter means configured to receive digital signals by coherent receiving systems; a coefficient control means configured to control coefficients defining characteristics of the equalization filter means; a significant coefficient holding means configured to hold significant coefficients of significant values among initial values of the coefficients; a significant coefficient positioning means configured to determine a significant coefficient position, a position of the significant coefficients in the initial values, so that equalization characteristics of the equalization filter means may be optimized; and a significant coefficient setting means configured to allocate the significant coefficients to the significant coefficient position.

An optical receiver according to an exemplary aspect of the invention includes a coherent optical receiving means, a local oscillator light source, an analog-to-digital (A/D) conversion means, and a digital signal processing means, wherein the digital signal processing means includes an equalization signal processor, wherein the equalization signal processor includes an equalization filter means configured to receive digital signals by coherent receiving systems; a coefficient control means configured to control coefficients defining characteristics of the equalization filter means; a significant coefficient holding means configured to hold significant coefficients of significant values among initial values of the coefficients; a significant coefficient positioning means configured to determine a significant coefficient position, a position of the significant coefficients in the initial values, so that equalization characteristics of the equalization filter means may be optimized; and a significant coefficient setting means configured to allocate the significant coefficients to the significant coefficient position.

A method for equalization signal processing according to an exemplary aspect of the invention includes the steps of: holding significant coefficients of significant values among initial values of coefficients including a numerical value sequence defining equalization filter characteristics; determining a significant coefficient position, a position of the significant coefficients in the initial values, so as to optimize the equalization filter characteristics; and allocating the significant coefficients to the significant coefficient position.

Effect of The Invention

According to the equalization signal processor of the present invention, it is possible to perform the optimum equalization signal processing in coherent receiving systems even if a channel response in an optical fiber transmission line includes a factor without temporal centrosymmetry.

DESCRIPTION OF EMBODIMENTS

The exemplary embodiments of the present invention will be described with reference to drawings below.

[The First Exemplary Embodiment]

Figure 1:
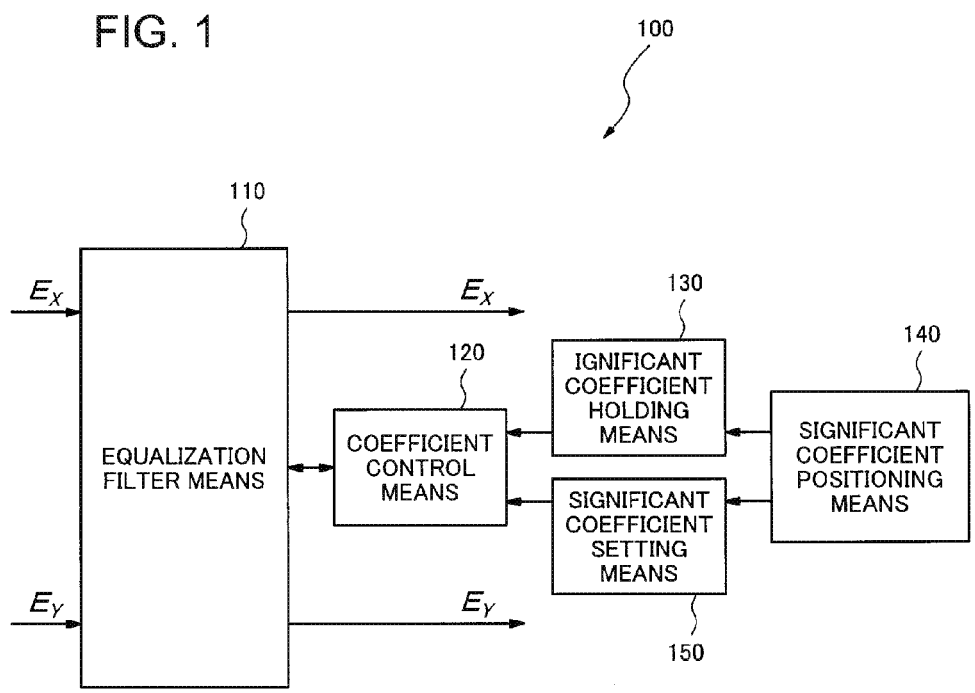
FIG. 1 is a block diagram illustrating a configuration of an equalization signal processor in accordance with the first exemplary embodiment of the present invention.

FIG. 1 is a block diagram illustrating a configuration of an equalization signal processor 100 in accordance with the first exemplary embodiment of the present invention. The equalization signal processor 100 includes an equalization filter means 110, a coefficient control means 120, a significant coefficient holding means 130, a significant coefficient positioning means 140 and a significant coefficient setting means 150.

Digital signals $E_X$ and $E_Y$ received by coherent receiving systems are input into the equalization filter means 110, which outputs output signals $E_x$ and $E_y$ which are weighted with coefficients defining characteristics of the equalization filter means. The coefficient control means 120 controls the coefficients of the equalization filter means 110. The significant coefficient holding means 130 holds significant coefficients which are significant values among initial values of the coefficients. Here, the significant coefficients are defined as coefficients having significant nonzero values. The significant coefficient positioning means 140 determines a significant coefficient position where the initial values of the significant coefficients are allocated so that the equalization characteristics of the equalization filter means 110 may be optimized. The significant coefficient setting means 150 allocates the significant coefficients to the significant coefficient position determined by the significant coefficient positioning means 140. The coefficient control means 120 sets the initial values of the significant coefficients allocated then at the equalization filter means 110.

According to the equalization signal processor 100 of the present exemplary embodiment, it is possible for the significant coefficient positioning means 140 to allocate a significant value as an initial value of a coefficient of the equalization filter means 110 to not only the center of the initial values but also an optional position. As a result, it becomes possible to perform the optimum equalization signal processing in coherent receiving systems even if a channel response includes a factor without temporal centrosymmetry.

Here, the equalization filter means 110 can be a finite impulse response (FIR) filter. The number of the significant coefficients can be smaller than the tap length of the FIR filter. This makes the determination process of the initial value simpler because it is only necessary to perform an optimization processing on the significant coefficient which is composed of the smaller number than the tap length even if the optimization is performed by using a plurality of options for the initial value. As a result, it becomes possible to reduce the capacity of a storage means for holding the options for the initial value and to shorten the time of startup required to determine the initial value.

Figure 2:
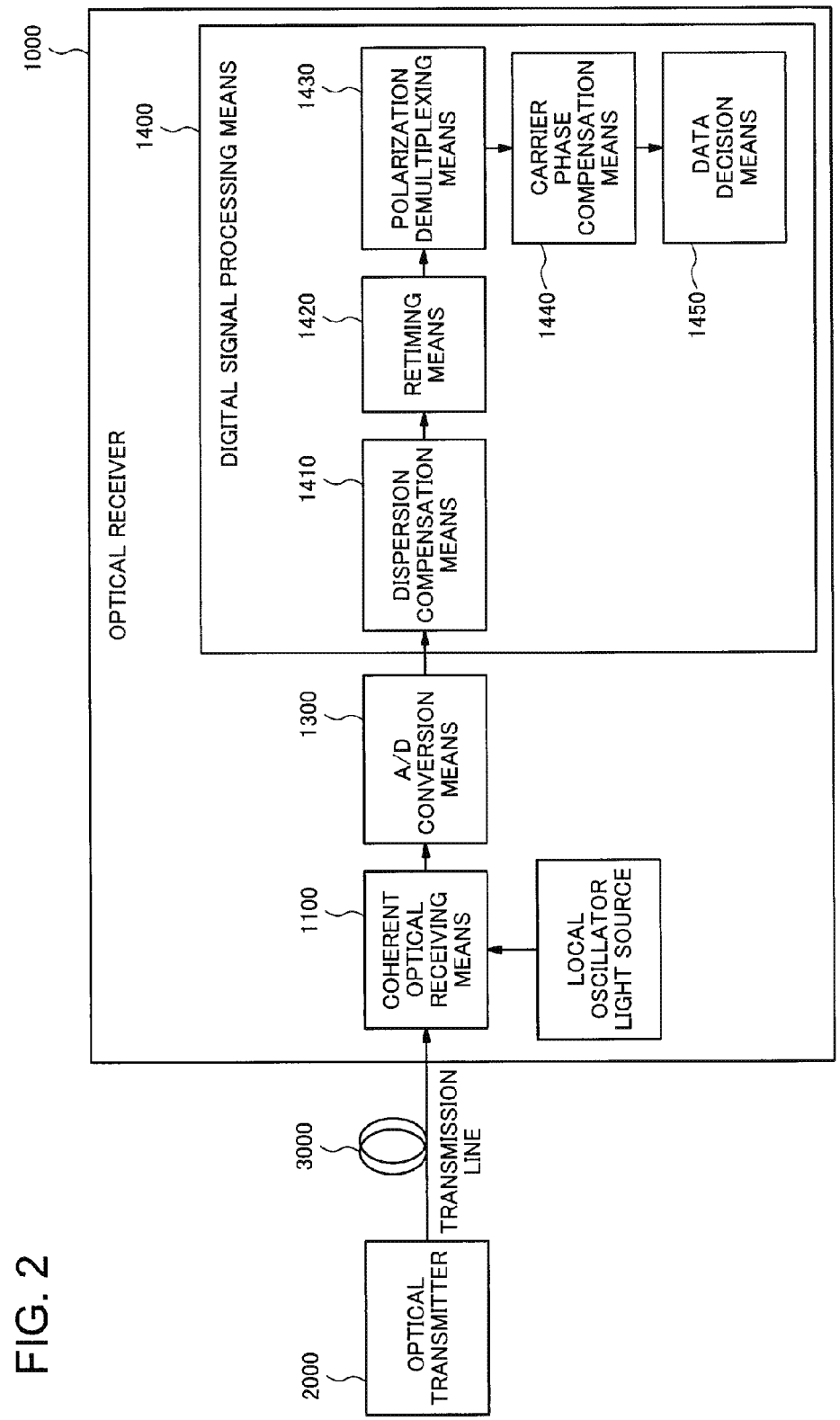
FIG. 2 is a block diagram illustrating a configuration of an optical transmission system employing an optical receiver in accordance with the first exemplary embodiment of the present invention.

Next, a description will be given of an optical receiver including the equalization signal processor 100 according to the present exemplary embodiment will be described. FIG. 2 is a block diagram illustrating a configuration of an optical transmission system employing the optical receiver 1000 in accordance with the present exemplary embodiment.

The optical receiver 1000 receives optical signals which have been output from an optical transmitter 2000 and transmitted through a transmission line 3000 such as an optical fiber. In the present exemplary embodiment, the optical signal output from the optical transmitter 2000 is composed of a dual polarization quadrature phase shift keying (DP-QPSK) signal.

The optical receiver 1000 includes a coherent optical receiving means 1100, a local oscillator light source 1200, an analog-to-digital (A/D) conversion means 1300, and a digital signal processing means 1400. The optical receiver 1000 performs the coherent receiving in which received optical signals are made to interfere with the local oscillator light from the local oscillator light source 1200 in the coherent optical receiving means 1100. The coherent optical receiving means 1100 is composed of an optical hybrid circuit and balanced photodetectors, for example.

The signals received by the coherent receiving are converted by the analog-to-digital (A/D) conversion means 1300 into digital signals, which are input into the digital signal processing means 1400 located in the subsequent stage. The signals input into the digital signal processing means 1400 corresponds to a real component $E_{Xi}$ and an imaginary component $E_{Xq}$ of the complex envelope of the coherently detected electric field in the X-polarization direction, and a real component $E_{Yi}$ and an imaginary component $E_{Yq}$ of the complex envelope of the electric field in the Y-polarization direction, respectively.

The digital signal processing means 1400 performs a process for compensating a factor causing signal degradation in the transmission channel, and then performs a signal decision. As shown in FIG. 2, the digital signal processing means 1400 can be configured to include a dispersion compensation means 1410, a retiming means 1420, a polarization demultiplexing means 1430, a carrier phase compensation means 1440, and a data decision means 1450, for example. The dispersion compensation means 1410 compensates the chromatic dispersion due to the transmission line 3000, and the retiming means 1420 optimizes the sampling timing. Here, the sampling rate after resampling can be one sample per symbol time. It is not limited to this, but it can be configured that the sampling rate after resampling is set at N samples per symbol time and then it is converted into one sample per symbol time by interposing a downsampling means, which is not shown in the figure, in a stage following the polarization demultiplexing means 1430.

The polarization demultiplexing means 1430 performs a polarization demultiplexing process and a compensation process of polarization mode dispersion, and the carrier phase compensation means 1440 performs a compensation process of a phase difference between the carrier and the local oscillator light in the received signals. Finally, the data decision means 1450 performs a signal decision process. Here, the polarization demultiplexing means 1430 is composed of the equalization signal processor 100 of the present exemplary embodiment. As a result, according to the optical receiver 1000 of the present exemplary embodiment, it becomes possible to perform the optimum polarization demultiplexing and polarization mode dispersion compensation process even if a channel response in the transmission line 3000 includes a factor without temporal centrosymmetry.

[The Second Exemplary Embodiment]

Figure 3:
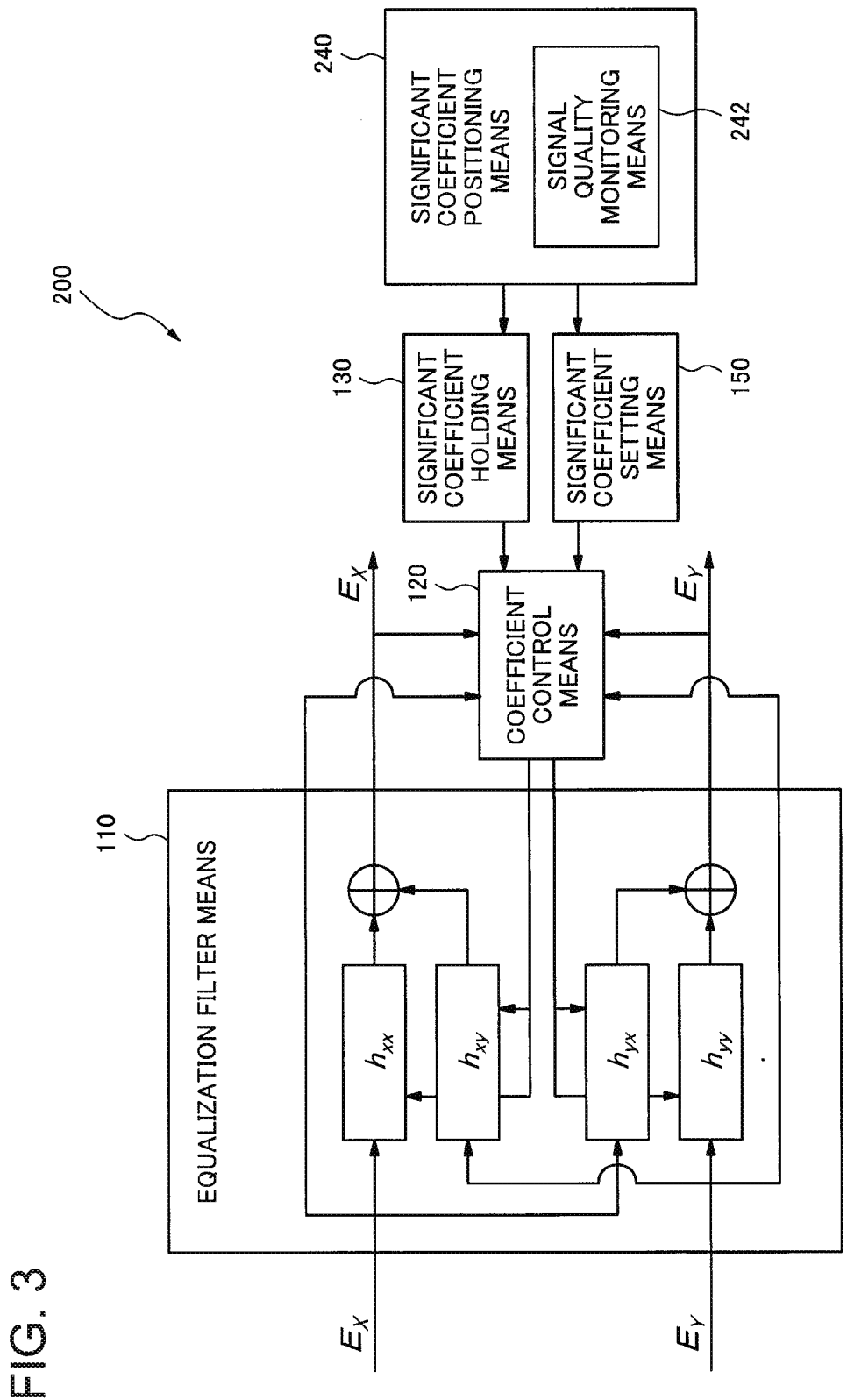
FIG. 3 is a block diagram illustrating a configuration of an equalization signal processor in accordance with the second exemplary embodiment of the present invention.

Next, the second exemplary embodiment of the present invention will be described. FIG. 3 is a block diagram illustrating a configuration of an equalization signal processor 200 in accordance with the second exemplary embodiment of the present invention. The equalization signal processor 200 includes the equalization filter means 110, the coefficient control means 120, the significant coefficient holding means 130, a significant coefficient positioning means 240, and the significant coefficient setting means 150. The equalization signal processor 200 differs from the equalization signal processor 100 in accordance with the first exemplary embodiment in that the significant coefficient positioning means 240 is configured to include a signal quality monitoring means 242. The signal quality monitoring means 242 detects signal quality of outputs from the equalization filter means 110, and the significant coefficient positioning means 240 determines a significant coefficient position on the basis of the signal quality. The other configurations are similar to those of the equalization signal processor 100, and the same code is used for a similar component to that in the first exemplary embodiment.

Next, a further detailed description will be given of the equalization signal processor 200 in accordance with the present exemplary embodiment. A butterfly-structured FIR filter can be used as the equalization filter means 110, in which case the coefficient control means 120 controls the tap coefficients of the FIR filter.

The significant coefficient holding means 130 holds a Jones matrix whose temporal spread is smaller than the tap length of the FIR filter as a significant coefficient used for the initial setting of the tap coefficients of the FIR filter. Here, the Jones matrix represents an optical response, that is, input-output relations, in two polarizations (X,Y) orthogonal mutually in a medium under consideration (for example, a fiber transmission line).

An X-polarization input $E_X(k)$ and a Y-polarization input $E_Y(k)$ are input into the equalization filter means 110. In the following description, complex signals are processed in the digital signal processing. The equalization filter means 110 weights the X-polarization input with the tap coefficient $h_{xx}$ and the Y-polarization input with the tap coefficient hxy, subsequently sums them by using a complex adder, and outputs an X-polarization output $E_x(k)$ expressed by formula (1). Similarly, the equalization filter means 110 weights the X-polarization input with the tap coefficient $h_{yx}$, the Y-polarization input with the tap coefficient $h_{yy}$, subsequently sums them by using a complex adder, and outputs a Y-polarization output $E_y(k)$ expressed by formula (2). The coefficient control means 120 sets initial values for the tap coefficients $h_{xx}$ and the like and subsequently controls them adaptively. When the tap coefficients are controlled by using the CMA method as an example of the adaptive control, the coefficient control means 120 calculates an updated value of the tap coefficient by calculating the second term of the right side of each of formulae (12) to (15) described in Non Patent Literature 1, and controls the tap coefficient.

In the present exemplary embodiment, the initial values of the tap coefficients set by the coefficient control means 120 are controlled at a startup of the optical receiver by the significant coefficient holding means 130, the significant coefficient setting means 150, and the signal quality monitoring means 242 which is included in the significant coefficient positioning means 240. The significant coefficient holding means 130 holds significant coefficients as set values of the tap coefficients expressed by an FIR filter whose tap length is smaller than that of the FIR filter for performing the adaptive control. That is to say, it holds a Jones matrix whose tap length is smaller than that of the butterfly-structured FIR filter. Hereafter, the significant coefficients as set values of tap coefficients are referred to as a Jones matrix. For example, if a tap length of the FIR filter to perform the adaptive control (the equalization filter means 110) is represented by "M", there are 4M pieces of tap coefficients in total as shown below.

$$h_{xx}=[h_{xx}(0),\ldots,h_{xx}(M-1)],$$

$$h_{xy}=[h_{xy}(0),\ldots,h_{xy}(M-1)],$$

$$h_{yx}=[h_{yx}(0),\ldots,h_{yx}(M-1)],$$

$$h_{yy}=[h_{yy}(0),\ldots,h_{yy}(M-1)]$$

In contrast, the significant coefficient holding means 130 holds four sets of coefficients in total (4N pieces), each of which is composed of N pieces of coefficients with the number N being smaller than the tap length M (N<M), as shown below.

$$m_{xx}=[m_{xx}(0),\ldots,m_{xx}(N-1)],$$

$$m_{xy}=[m_{xy}(0),\ldots,m_{xy}(N-1)],$$

$$m_{yx}=[m_{yx}(0),\ldots,m_{yx}(N-1)],$$

$$m_{yy}=[m_{yy}(0),\ldots,m_{yy}(N-1)]$$

The following description will be given with the tap length M of the FIR filter equal to seven (M=7). The description will be also given with N equal to one concerning a Jones matrix set as initial values and the significant coefficient holding means 130 holding the following Jones matrix.

$$\begin{pmatrix} h_{xx} & h_{xy} \\ h_{yx} & h_{yy} \end{pmatrix} = \begin{pmatrix} 1 & 0 \\ 0 & 1 \end{pmatrix}$$

Although there are 28 pieces in total with regard to tap coefficients of the butterfly-structured FIR filter with the tap length M equal to seven (M=7), it is only necessary to hold the coefficients expressed by a 2-by-2 matrix only in the above-described example according to the present exemplary embodiment. Here, it is also acceptable that the significant coefficient holding means 130 holds a plurality of different Jones matrices as shown below:

$$\begin{pmatrix} h_{xx} & h_{xy} \\ h_{yx} & h_{yy} \end{pmatrix} = \begin{pmatrix} \cos\theta & -\sin\theta \\ \sin\theta & \cos\theta \end{pmatrix}$$

Figure 4:
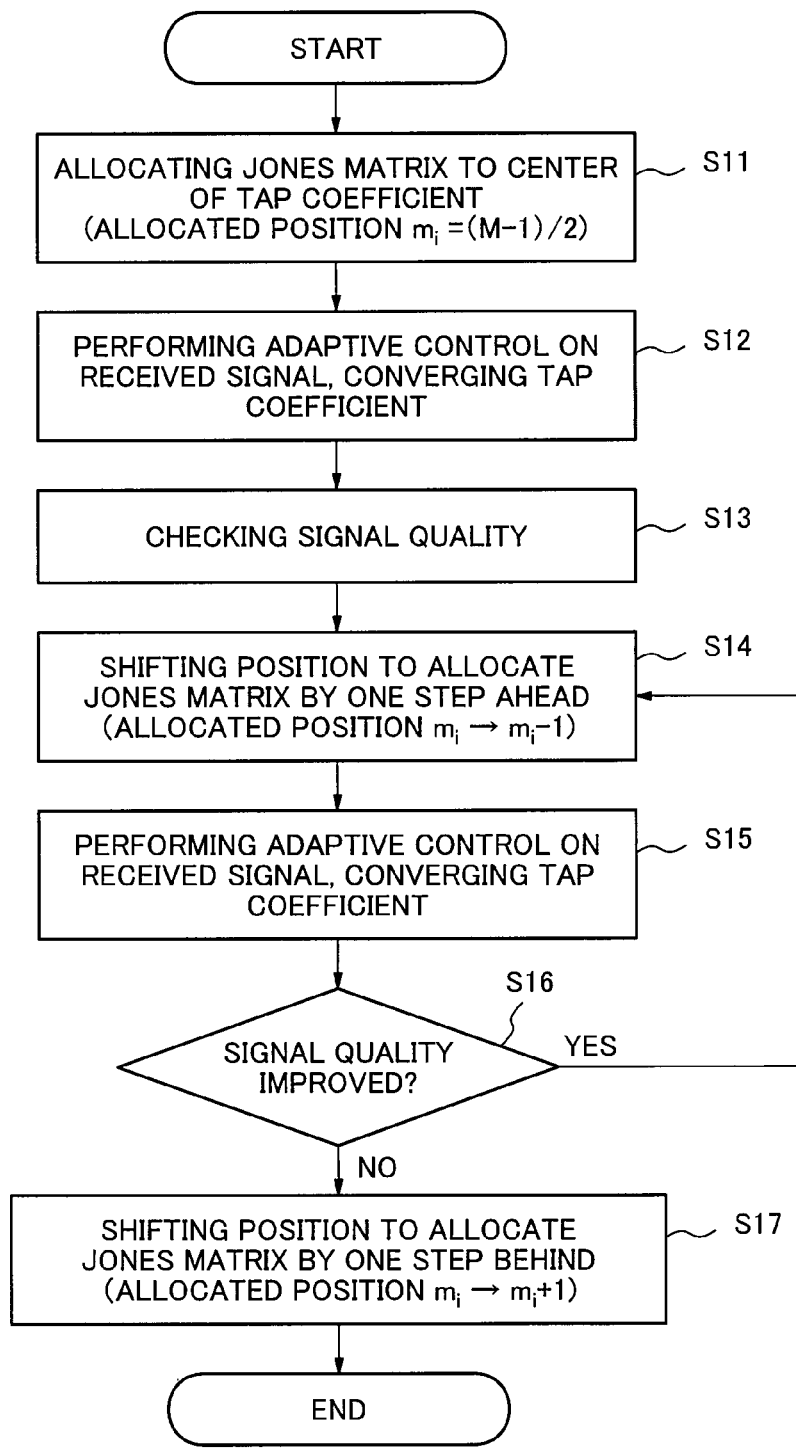
FIG. 4 is a flowchart illustrating an operation of setting initial values of the equalization signal processor in accordance with the second exemplary embodiment of the present invention.

Next, a description will be given of the operation of the equalization signal processor 200 in accordance with the present exemplary embodiment. FIG. 4 is a flowchart to illustrate the operation of setting initial values of the equalization signal processor 200 in accordance with the present exemplary embodiment. First, the coefficient control means 120 allocates a Jones matrix held by the significant coefficient holding means 130 to the center of the tap coefficients of the FIR filter composed of a numerical value sequence, and sets it for a first initial value of the tap coefficient (step S11). That is to say, the tap coefficients $h_{xx}$ and the like are set as follows:

$h_{xx}$=[0001000],$h_{xy}$=[0000000],$h_{yx}$=[0000000],$h_{yy}$= [0001000]

The significant coefficient setting means 150 holds the position in the FIR filter coefficients to which the Jones matrix is allocated as the initial value. In this case, the allocated position $m_i$ in the FIR filter coefficient is expressed as follows:

$$m_i = \frac{M-1}{2}$$
$$= 3$$

Next, the tap coefficient is converged by activating the adaptive control by the CMA or the like using the first initial value, and a first coefficient is obtained (step S12). Subsequently, the signal quality monitoring means 242 checks the signal quality (first signal quality) (step S13). The signal quality monitoring means 242 monitors the signal quality by using as an index, a signal bit error rate, a spread of signal point distribution represented by an Error Vector Magnitude (EVM), a cost function of the CMA shown below and the like, for example.

$(1-|E_x|^2)^2$

Next, the significant coefficient setting means 150 shifts the position in the FIR filter coefficient where the Jones matrix is allocated by one step ahead. In this case, the allocated position $m_i$ in the FIR filter coefficient is shown as follows:

$m_i \rightarrow m_i - 1 = 2$

According to the above, the coefficient control means 120 changes the position to which to allocate the Jones matrix held by the significant coefficient holding means 130, and changes the initial value of the tap coefficient and sets a second initial value (step S14). That is to say, the tap coefficients $h_{xx}$ and the like are set as follows:

$h_{xx}$=[0010000],$h_{xy}$=[0000000],$h_{yx}$=[0000000],$h_{yy}$= [0010000]

Then, as is the case with the above, the tap coefficient is converged by activating the adaptive control by the CMA or the like, and a second coefficient is obtained (step S15). Subsequently, the signal quality monitoring means 242 checks the signal quality (second signal quality) again, and determines whether the signal quality has been improved or not (step S16).

If the results of determination of the signal quality show that the signal quality has deteriorated (the step S16/NO), the significant coefficient setting means 150 shifts the position in the FIR filter coefficient where the Jones matrix is allocated by one step behind. According to the above, the coefficient control means 120 sets the initial value of the tap coefficient (step S17). This makes the control of the initial value of the tap coefficient be completed.

On the other hand, if the results of determination of the signal quality show that the signal quality has improved (step S16/YES), the process is repeated returning to the step S14.

The process flow illustrated in FIG. 4 shows a case where the search for the optimum allocated position in the FIR filter coefficient is performed in the forward range from the center of the filter coefficient. Since a main channel response without temporal centrosymmetry is a response with a trailing region in the fall time due to a low-pass effect, it is sufficiently effective even if the search is performed only in the forward range. If a smooth channel response is expected in the rise time, it is only necessary to perform the search for the allocated position in the FIR filter coefficient in the backward range from the center by a similar method.

If the significant coefficient holding means 130 holds a plurality of Jones matrices as an option for the significant coefficient, a search for the optimum option can be performed using the signal quality monitor means 242 in the preceding stage or following stage of the process flow shown in FIG. 4. Specifically, for example, the optimum option can be searched as follows:

Jones matrices with a smaller size than the tap length of the butterfly-structured FIR filter, which are held in the significant coefficient holding means 130, are represented by $H_1$, $H_2$ ... $H_n$. First, the significant coefficient holding means 130 outputs the Jones matrix $H_1$ to the coefficient control means 120. Next, an optimum initial value allocated position is obtained according to the process flow shown in FIG. 4. The significant coefficient setting means 150 holds the optimum position at the time. And then, the significant coefficient holding means 130 outputs the Jones matrix $H_2$ to the coefficient control means 120. The coefficient control means 120 sets initial values of the tap coefficients by using the Jones matrix $H_2$ and the optimum initial value allocated position obtained by the significant coefficient setting means 150. Subsequently, the tap coefficients are converged by performing the adaptive control of the tap coefficients on received signals. The signal quality at the time is checked. By repeating a similar process, the significant coefficient holding means 130 holds the Jones matrix maximizing the signal quality among the Jones matrices $H_1$, $H_2$, ..., $H_n$, and sets initial values of the tap coefficients at the optimum initial value position corresponding to it. In this way, it is possible to set optimum initial values of the tap coefficients.

As mentioned above, the allocated position of a Jones matrix in initial values of the filter coefficients is controlled by performing the feedback control by means of monitoring the quality of output signals at a startup of the optical receiver. As a result, it becomes possible to perform the optimum equalization process even if a response of transmission characteristics does not have the temporal centrosymmetry. Further, when the optimization process is performed by searching predetermined options of initial values of the butterfly-structured FIR filter, it is possible to simplify a process of the optimization because it is only necessary to use only Jones matrix as an option of the initial value.

[The Third Exemplary Embodiment]

Figure 5:
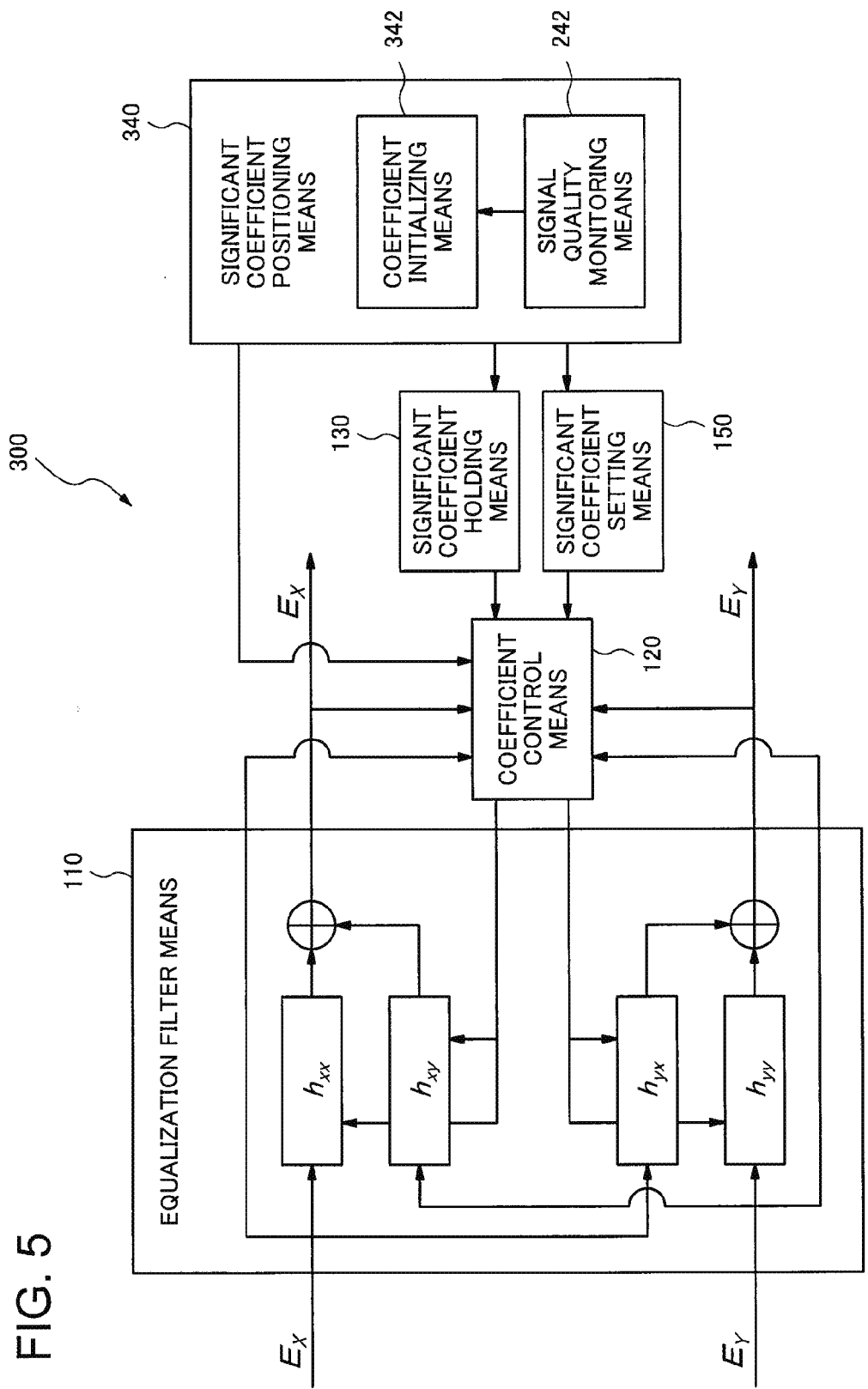
FIG. 5 is a block diagram illustrating a configuration of an equalization signal processor in accordance with the third exemplary embodiment of the present invention.

Next, the third exemplary embodiment of the present invention will be described. FIG. 5 is a block diagram illustrating a configuration of an equalization signal processor 300 in accordance with the third exemplary embodiment of the present invention. The equalization signal processor 300 includes the equalization filter means 110, the coefficient control means 120, the significant coefficient holding means 130, a significant coefficient positioning means 340, and the significant coefficient setting means 150. The equalization signal processor 300 differs from the equalization signal processor 200 in accordance with the second exemplary embodiment in that the significant coefficient positioning means 340 is configured to include a coefficient initializing means 342 in addition to the signal quality monitoring means 242.

If the condition of the transmission line varies greatly while the coefficient control means 120 is adaptively controlling the filter coefficients of the butterfly-structured FIR filter as the equalization filter means 110, there is a possibility that the result of the adaptive control falls into a local optimum solution.

As described in Non Patent Literature 2, the selection of initial values of the tap coefficients contributes largely to their convergence in the adaptive equalization process. Depending on the selection of the initial values, therefore, a case could occur where the adaptive control causes falling into a local optimum solution. In order to avoid falling into a local optimum solution like that, it is considered as a simple method preparing a plurality of options as initial values of the tap coefficients. It is inconvenient, however, to search a whole extent of initial values of possible tap coefficients because problems arise such as an increase in the memory size necessary for options of the initial values of the tap coefficients and an increase in the startup time due to the search.

According to the equalization signal processor 300 in accordance with the present exemplary embodiment, it is possible to prevent the results of the adaptive control from falling into a local optimum solution, as described below.

The signal quality monitoring means 242 included in the significant coefficient positioning means 340 monitors the signal quality of the outputs from the equalization filter means 110. As is the case in the second exemplary embodiment, it is possible to use, as an index of the signal quality, a signal bit error rate, a spread of signal point distribution represented by an Error Vector Magnitude (EVM), a cost function of the CMA shown below and the like.

$$(1-|E_x|^2)^2$$

The coefficient initializing means 342 determines whether or not the tap coefficients have fallen into a local optimum solution on the basis of the outputs of the signal quality monitoring means 242. It is possible by setting a certain threshold value for the signal quality to be monitored to determine whether or not the tap coefficients have fallen into a local optimum solution. If it is determined that the tap coefficients have fallen into a local optimum solution, falling into a local optimum solution is avoided tap by setting coefficients again and performing the adaptive control again.

Next, a description will be given of the operation of the equalization signal processor 300 in accordance with the present exemplary embodiment. First, by a similar operation to that of the equalization signal processor 200 in accordance with the second exemplary embodiment, the equalization signal processor 300 sets initial values of the tap coefficients. The significant coefficient holding means 130 and the significant coefficient setting means 150 hold the initial values at the time respectively. The coefficient control means 120, using the initial values, performs the adaptive control of the tap coefficients for received signals.

The coefficient initializing means 342 determines whether or not the tap coefficients have fallen into a local optimum solution on the basis of the outputs of the signal quality monitoring means 242. If it is determined that the tap coefficients have fallen into a local optimum solution, the coefficient initializing means 342 informs the coefficient control means 120 about it. The coefficient control means 120 which has received the information initializes the tap coefficients. The initialization of the tap coefficients is performed by setting the tap coefficients again, allocating the Jones matrix to the designated position and using the set values of the tap coefficients held in the significant coefficient holding means 130 and the significant coefficient setting means 150. After setting the tap coefficients again, the coefficient control means 120 performs the adaptive control again.

As a result, it becomes possible to prevent the results of the adaptive control from falling into a local optimum solution. In addition, it is possible to reduce the time required for the control to obtain the optimum characteristics. The reason is as follows: Although the optimum Jones matrix as initial values varies easily and rapidly due to the variation of the transmission line, a device used in a transceiver such as an analog-to-digital converter (ADC) is a strong contributor to determination of the optimum position for allocating the Jones matrix. Therefore, the temporal variation is less likely to occur, and the value is available which has been adjusted initially and held without change. As a result, it is possible to reduce the time required for the control to obtain the optimum characteristics as compared with a case of redoing the control by allocating a Jones matrix to the center again.

It is also acceptable for the significant coefficient holding means 130 to designate a different Jones matrix from one having been held from among a plurality of prepared options keeping the setting in the significant coefficient setting means 150 held. The coefficient control means 120 allocates the Jones matrix to the designated position and performs the adaptive control by setting the tap coefficients again. By repeating the process, it is possible to avoid falling into a local optimum solution. The temporal variation is less likely to occur in the optimum position of a Jones matrix set as initial values unlike the optimum Jones matrix. By using the above-mentioned method, therefore, it is possible to reduce the number of initializing tap coefficients required by the time when the local optimum solution has been avoided.

[The Fourth Exemplary Embodiment]

Figure 6:
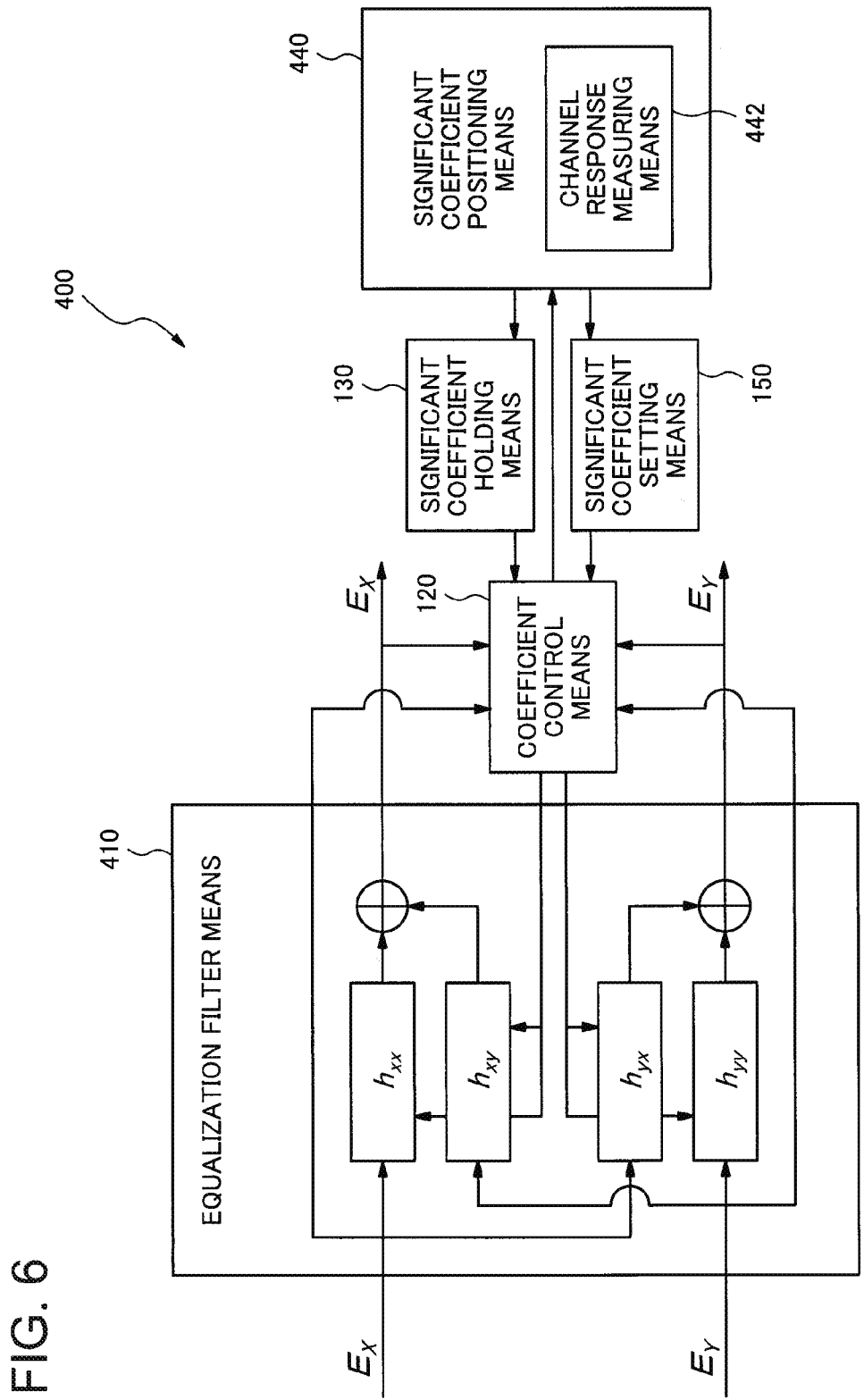
FIG. 6 is a block diagram illustrating a configuration of an equalization signal processor in accordance with the fourth exemplary embodiment of the present invention.

Next, the fourth exemplary embodiment of the present invention will be described. FIG. 6 is a block diagram illustrating a configuration of an equalization signal processor 400 in accordance with the fourth exemplary embodiment of the present invention. The equalization signal processor 400 includes an equalization filter means 410, the coefficient control means 120, the significant coefficient holding means 130, a significant coefficient positioning means 440, and the significant coefficient setting means 150. The equalization signal processor 400 differs from the equalization signal processor 200 in accordance with the second exemplary embodiment in a configuration of the equalization filter means 410 and in that the significant coefficient positioning means 440 is configured to include a channel response measuring means 442.

In the present exemplary embodiment, two kinds of butterfly-structured FIR filters having different tap lengths are employed as the equalization filter means 410. One is a butterfly-structured FIR filter used for the signal processing in receiving data signals, and its tap length is represented by a first tap length M. The other is a butterfly-structured FIR filter used for obtaining the optimum position of significant coefficients (a Jones matrix) in initial values at the startup of the equalization signal processor 400, and a second tap length M' of its tap length is configured to be larger than the above-mentioned tap length M. A description will be given below of a case in which both M and M' are odd numbers, M=7, and M=13.

Here, it is acceptable for the above-mentioned two kinds of butterfly-structured FIR filters to have different circuit configurations. However, it is not limited to this, but it is also acceptable that a single butterfly-structured FIR filter is utilized commonly by obtaining an optimum position of significant coefficients (a Jones matrix) in initial values and then setting fixedly the tap coefficients $h'_{xx}$ and the like of the butterfly-structured FIR filter used at that time as follows:

$$h'_{xx}(M) = \ldots = h'_{xx}(M'-1) = 0$$

Next, a description will be given of the operation of the equalization signal processor 400 according to the present exemplary embodiment. In setting initial values of the tap coefficients of the FIR filters, the equalization signal processor 400 obtains an optimum position of significant coefficients (a Jones matrix) as follows:

First, the coefficient control means 120 allocates a Jones matrix to the center of the tap coefficients of the butterfly-structured FIR filter with the tap length M'. For example, the allocation is performed as follows:

$$h'_{xx} = [0000001000000]$$

$$h'_{xy} = [0000000000000]$$

$$h'_{yx} = [0000000000000]$$

$$h'_{yy} = [0000001000000]$$

Next, the coefficient control means 120 converges the tap coefficients by performing the adaptive control by means of the CMA method or the like. If the adaptive control is performed properly, the converged tap coefficients become an inverse response of the channel response. Here, the channel means a transmission channel, that is, a fiber transmission line in optical communications, and the channel response means an input-output relation of the fiber transmission line. After the tap coefficients have converged, the coefficient control means 120 transmits the tap coefficients after the convergence to the significant coefficient positioning means 440.

Figure 7:
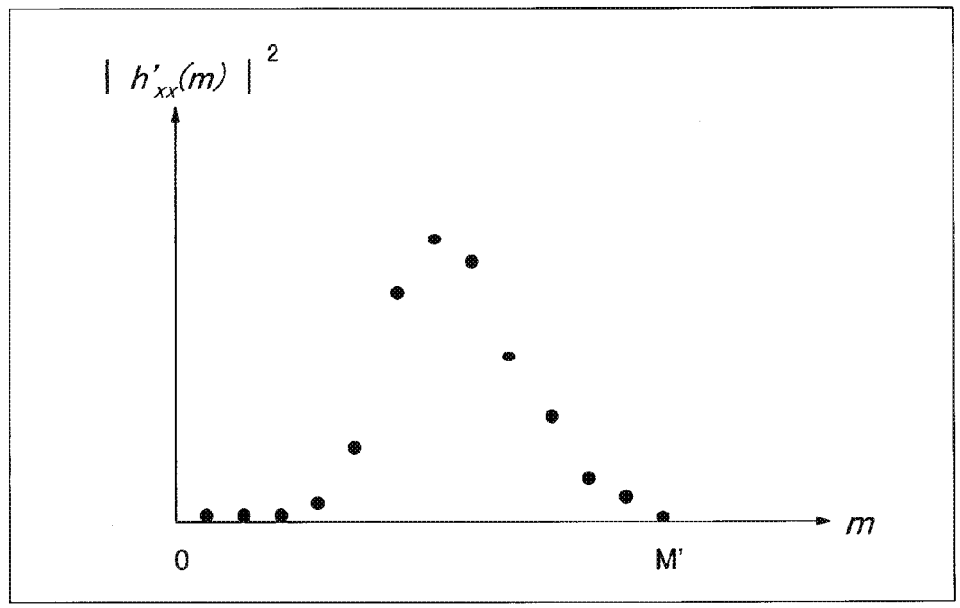
FIG. 7 is a diagram illustrating an example of calculation results of the magnitudes of tap coefficients after the convergence in the equalization signal processor in accordance with the fourth exemplary embodiment of the present invention.

In the significant coefficient positioning means 440, the channel response measuring means 442 calculates the magnitude of the tap coefficients (absolute values of tap coefficients) after the convergence respectively. For example, $|h'_{xx}(m)|^2$ is calculated as the magnitude of the tap coefficient $h'_{xx}(m)$ after the convergence. FIG. 7 shows an example of calculated results of the magnitude of tap coefficient after the convergence. Here, there is a possibility that the value of $|h'_{xx}(m)|^2$ does not have a significant magnitude depending on the polarization state of the received signals. It is also acceptable, therefore, to calculate a value of $|h'_{xx}(m)|^2 + |h'_{yx}(m)|^2$ or the like as an absolute value of tap coefficients in order to estimate the optimum position of a more appropriate Jones matrix.

Next, the channel response measuring means 442 calculates a moving integrated value of the magnitudes of the tap coefficients after the convergence. From the results, the optimum allocated position of a Jones matrix in initial values is estimated with respect to the FIR filter with the tap length M which is used for the signal processing in receiving data signals.

A further detailed description will be given below of an estimation of the optimum allocated position of a Jones matrix. It can be estimated that among the tap coefficients with the tap length M' after convergence, M pieces of coefficients including those from the number of $$\frac{M'-1}{2} - \frac{M-1}{2}$$

to the number of $$\frac{M'-1}{2} + \frac{M-1}{2},$$

centering around the middle position, correspond to a response in a case of allocating the Jones matrix to the number of $$\frac{M-1}{2},$$

which is the middle position of the FIR filter with the tap length M.

Similarly, it can be estimated that among the tap coefficients with the tap length M' after convergence, M pieces of coefficients including those from the number of $$\frac{M'-1}{2} - m_i$$

to the number of $$\frac{M'-1}{2} - m_i + M - 1,$$

correspond to a response in a case of allocating the Jones matrix for initial values to the $m_i$-th position of the FIR filter with the tap length M.

Accordingly, out of $|h'_{xx}(m)|^2$ of the tap coefficients with the tap length M' after convergence, by extracting those from the number of $$\frac{M'-1}{2} - m_i$$

to the number of $$\frac{M'-1}{2} - m_i + M - 1$$

and summing them up, a moving integrated value below is obtained, $$\sum_{m=\frac{M'-1}{2}-m_i}^{\frac{M'-1}{2}-m_i+M-1} |h'_{xx}(m)|^2,$$

which becomes an indicator index representing how much the inverse response of the channel response can be expressed by the adaptive control when the Jones matrix for initial values is allocated to the $m_i$-th position of the FIR filter with the tap length M.

As mentioned above, it is possible to estimate the optimum allocated position of the Jones matrix in initial values by the moving integrated value of the magnitudes of the tap coefficients after convergence.

Figure 8:
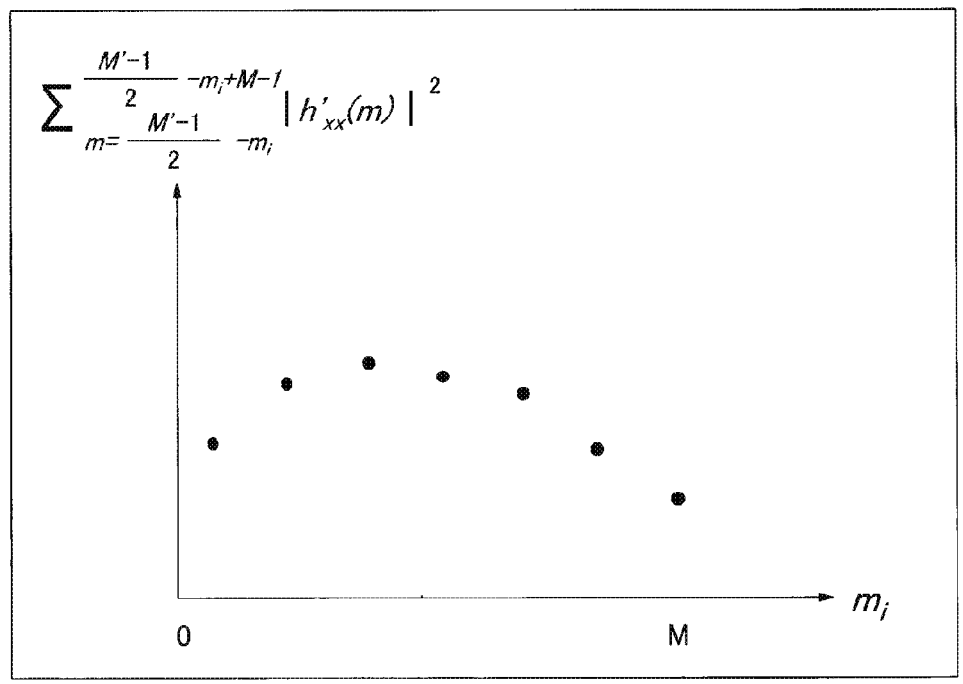
FIG. 8 is a diagram illustrating an example of calculation results of moving integrated values for converged tap coefficients in the equalization signal processor in accordance with the fourth exemplary embodiment of the present invention.
Figure 9:
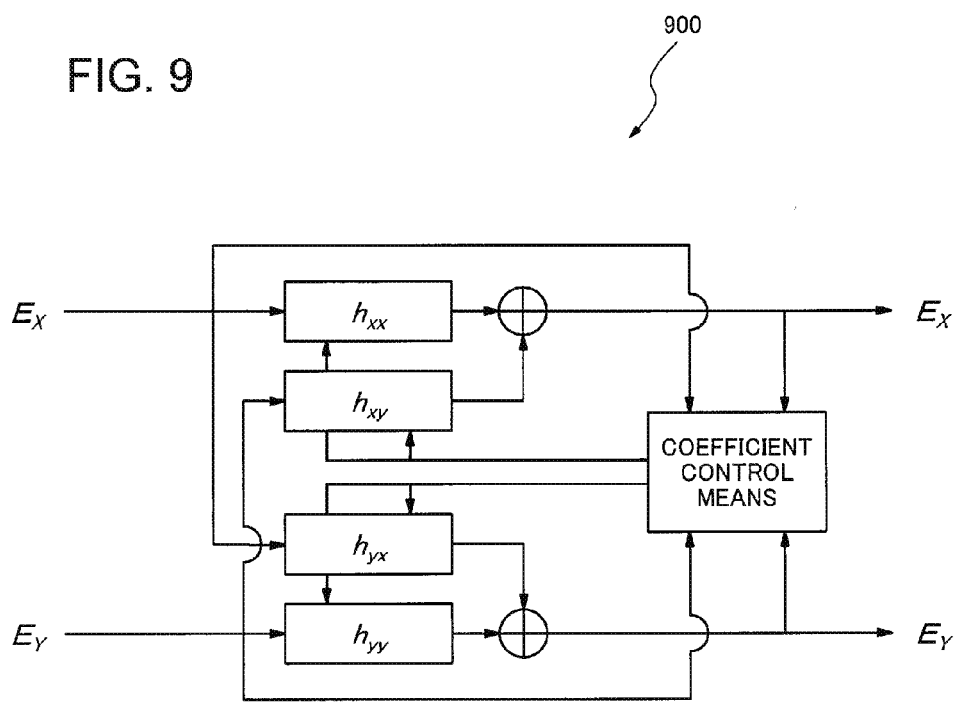
FIG. 9 is a block diagram illustrating a configuration of a related butterfly-structured FIR filter.

FIG. 8 shows an example of the results of the moving integrated values calculated for the tap coefficients after convergence (see FIG. 7). In the case shown in FIG. 8, the moving integrated value reaches its peak at $m_i=2$. It can be estimated, therefore, that the optimum allocated position of the Jones matrix in initial values is the position at $m_i=2$, which is shifted ahead by one from the center.

Thus, by calculating the moving integrated value of the magnitudes of the tap coefficients after convergence and obtaining its maximum value, it is possible to estimate the optimum allocated position of the Jones matrix in initial values. The significant coefficient positioning means 440 transmits the estimated optimum allocated position of the Jones matrix to the significant coefficient setting means 150. On the basis of the information, the significant coefficient setting means 150 sets initial values of the tap coefficients of the butterfly-structured FIR filter used for the received data signal processing.

As mentioned above, in the equalization signal processor 400 in accordance with the present exemplary embodiment, the optimum allocated position of the Jones matrix in initial values is estimated by calculating the moving integrated value of the magnitudes of the tap coefficients after convergence and obtaining its maximum value. As a result, it becomes possible to perform an optimum equalization processing even if a response of transmission characteristics does not have temporal centrosymmetry.

The present invention is not limited to the above-mentioned exemplary embodiments and can be variously modified within the scope of the invention described in the claims. It goes without saying that these modifications are also included in the scope of the present invention.

DESCRIPTION OF THE CODES

100, 200, 300, 400 equalization signal processor
110, 410 equalization filter means
120 coefficient control means
130 significant coefficient holding means
140, 240, 340, 440 significant coefficient positioning means
150 significant coefficient setting means
242 signal quality monitoring means
342 coefficient initializing means
442 channel response measuring means
900 related butterfly-structured FIR filter
1000 optical receiver
1100 coherent optical receiving means
1200 local oscillator light source
1300 analog to digital (A/D) conversion means
1400 digital signal processing means
1410 dispersion compensation means
1420 retiming means
1430 polarization demultiplexing means
1440 carrier phase compensation means
1450 data decision means
2000 optical transmitter
3000 transmission line

What is claimed is:

1. An equalization signal processor, comprising:
an equalization filter configured to receive digital signals by coherent receiving systems;
a coefficient controller configured to control coefficients defining characteristics of the equalization filter;
a significant coefficient holding unit configured to hold significant coefficients of significant values among initial values of the coefficients;
a significant coefficient positioning unit configured to determine a significant coefficient position, a position of the significant coefficients in the initial values, so that equalization characteristics of the equalization filter may be optimized; and
a significant coefficient setting unit configured to allocate the significant coefficients to the significant coefficient position;
wherein:
the significant coefficient positioning unit-includes a signal quality monitor;
the signal quality monitor detects signal quality of output from the equalization filter;
the significant coefficient positioning unit determines the significant coefficient position on the basis of the signal quality;
the significant coefficient positioning unit further includes a coefficient initializing unit;
the coefficient initializing unit determines whether or not the coefficients have fallen into a local optimum solution on the basis of the output of the signal quality monitor, and if it is determined that the coefficients have fallen into a local optimum solution, sends a notification about it to the coefficient controller; and
the coefficient controller, in receiving the notification, sets the coefficients again and performs an adaptive control again keeping the optimum significant coefficient position held.

2. The equalization signal processor according to claim 1, wherein the equalization filter is a finite impulse response filter; and
the number of the significant coefficients is smaller than the tap length of the finite impulse response filter.

3. An equalization signal processor, comprising:
an equalization filter configured to receive digital signals by coherent receiving systems;
a coefficient controller configured to control coefficients defining characteristics of the equalization filter;
a significant coefficient holding unit configured to hold significant coefficients of significant values among initial values of the coefficients;
a significant coefficient positioning unit configured to determine a significant coefficient position, a position of the significant coefficients in the initial values, so that equalization characteristics of the equalization filter may be optimized; and a significant coefficient setting unit configured to allocate the significant coefficients to the significant coefficient position;

wherein:

the equalization filter includes finite impulse response filters with a first tap length and a second tap length larger than the first tap length;

the significant coefficient positioning unit includes a channel response measuring unit;

the coefficient controller makes the coefficients having the second tap length converge, and transmits the coefficients after convergence to the channel response measuring unit;

the channel response measuring unit calculates a moving integrated value of a magnitude of the tap coefficients after convergence; and the significant coefficient positioning unit estimates the significant coefficient position in the equalization filter having the first tap length on the basis of the moving integrated value.

4. The equalization signal processor according to claim 3, wherein the equalization filter is a finite impulse response filter; and the number of the significant coefficients is smaller than the tap length of the finite impulse response filter.

5. An optical receiver, comprising:

a coherent optical receiver, a local oscillator light source, an analog-to-digital (A/D) converter, and a digital signal processor, wherein:

the digital signal processor comprises an equalization signal processor, the equalization signal processor comprises:

an equalization filter configured to receive digital signals by coherent receiving systems;

a coefficient controller configured to control coefficients defining characteristics of the equalization filter;

a significant coefficient holding unit configured to hold significant coefficients of significant values among initial values of the coefficients;

a significant coefficient positioning unit configured to determine a significant coefficient position, a position of the significant coefficients in the initial values, so that equalization characteristics of the equalization filter may be optimized; and a significant coefficient setting unit configured to allocate the significant coefficients to the significant coefficient position;

the significant coefficient positioning unit further includes a coefficient initializing unit;

the coefficient initializing unit determines whether or not the coefficients have fallen into a local optimum solution on the basis of the output of a signal quality monitor, and if it is determined that the coefficients have fallen into a local optimum solution, sends a notification about it to the coefficient controller;

the coefficient controller, in receiving the notification, sets the coefficients again and performs an adaptive control again keeping the optimum significant coefficient position held;

the equalization filter includes finite impulse response filters with a first tap length and a second tap length larger than the first tap length;

the significant coefficient positioning unit includes a channel response measuring unit;

the coefficient controller makes the coefficients having the second tap length converge, and transmits the coefficients after convergence to the channel response measuring unit;

the channel response measuring unit calculates a moving integrated value of a magnitude of the tap coefficients after convergence; and the significant coefficient positioning unit estimates the significant coefficient position in the equalization filter having the first tap length on the basis of the moving integrated value.

6. A method for equalization signal processing, comprising the steps of:

holding significant coefficients of significant values among initial values of coefficients comprising a numerical value sequence defining equalization filter characteristics;

determining a significant coefficient position, a position of the significant coefficients in the initial values, so as to optimize the equalization filter characteristics; and allocating the significant coefficients to the significant coefficient position;

wherein the step of determining the significant coefficient position further comprises the steps of:

setting first initial values by allocating the significant coefficients to the center of the coefficients;

obtaining first coefficients by performing an adaptive control using the first initial values and making the coefficients converge;

obtaining a first signal quality of a signal quality determined by equalization filter characteristics defined by the first coefficients;

setting second initial values by shifting an allocated position in the coefficients of the significant coefficients by one row in one direction of the numerical value sequence;

obtaining second coefficients by performing the adaptive control using the second initial values and making the coefficients converge;

obtaining a second signal quality of a signal quality determined by equalization filter characteristics defined by the second coefficients;

comparing the first signal quality with the second signal quality;

when the first signal quality being higher than the second signal quality, determining as the significant coefficient position a position obtained by shifting an allocated position in the coefficients of the significant coefficients by one row in a direction opposite to the one direction; and when the second signal quality being higher than the first signal quality, further shifting an allocated position in the coefficients of the significant coefficients by one row in the one direction, and repeating the process for obtaining the second signal quality.

7. The method for equalization signal processing according to claim 6, further comprising:

determining whether or not the second coefficients have fallen into a local optimum solution on the basis of the second quality; and when determining that the second coefficients have fallen into a local optimum solution, setting the second initial values again and performing an adaptive control again.

8. A method for equalization signal processing, comprising the steps of:

holding significant coefficients of significant values among initial values of coefficients comprising a numerical value sequence defining equalization filter characteristics;

determining a significant coefficient position, a position of the significant coefficients in the initial values, so as to optimize the equalization filter characteristics; and allocating the significant coefficients to the significant coefficient position;

wherein:

the tap length representing the length of a numerical value sequence of the coefficients is either a first tap length or a second tap length larger than the first tap length; and the step of determining the significant coefficient position further comprises the steps of:

making the coefficients with the second tap length converge by performing an adaptive control;

calculating a tap coefficient absolute value of a magnitude of the coefficient after the convergence;

calculating a moving integrated value of the tap coefficient absolute value; and determining the significant coefficient position in the coefficients having the first tap length on the basis of the moving integrated value.

9. An equalization signal processor, comprising:

an equalization filter configured to receive digital signals by coherent receiving systems;

a coefficient controller configured to control coefficients defining characteristics of the equalization filter;

a significant coefficient holding unit configured to hold significant coefficients of significant values among initial values of the coefficients;

a significant coefficient positioning unit configured to determine a significant coefficient position, a position of the significant coefficients in the initial values, so that equalization characteristics of the equalization filter may be optimized; and a significant coefficient setting unit configured to allocate the significant coefficients to the significant coefficient position;

wherein:

the equalization filter is a finite impulse response filter;

the number of the significant coefficients is smaller than the tap length of the finite impulse response filter;

the equalization filter includes finite impulse response filters with a first tap length and a second tap length larger than the first tap length;

the significant coefficient positioning unit includes a channel response measuring unit;

the coefficient controller makes the coefficients having the second tap length converge, and transmits the coefficients after convergence to the channel response measuring unit;

the channel response measuring unit calculates a moving integrated value of a magnitude of the tap coefficients after convergence; and the significant coefficient positioning unit estimates the significant coefficient position in the equalization filter having the first tap length on the basis of the moving integrated value.

10. The equalization signal processor according to claim 9, wherein the equalization filter is a finite impulse response filter; and the number of the significant coefficients is smaller than the tap length of the finite impulse response filter.

* * * * *